July 7, 1936.  P. RILEY  2,046,428

TRANSMISSION AND CHANGE SPEED MECHANISM

Filed July 10, 1935   3 Sheets-Sheet 1

INVENTOR
Percy Riley
BY
Mawhinney & Mawhinney
ATTORNEYS

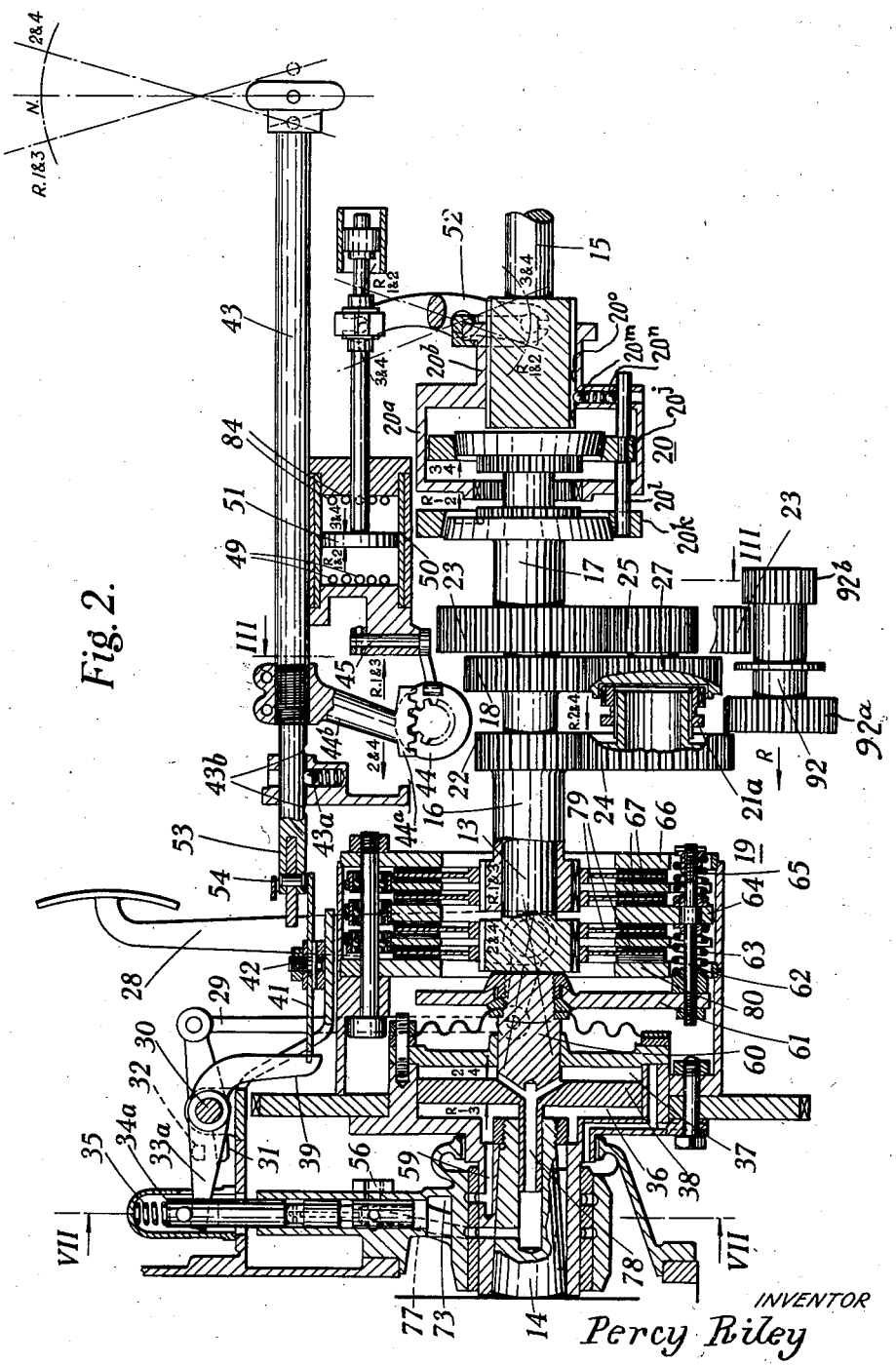

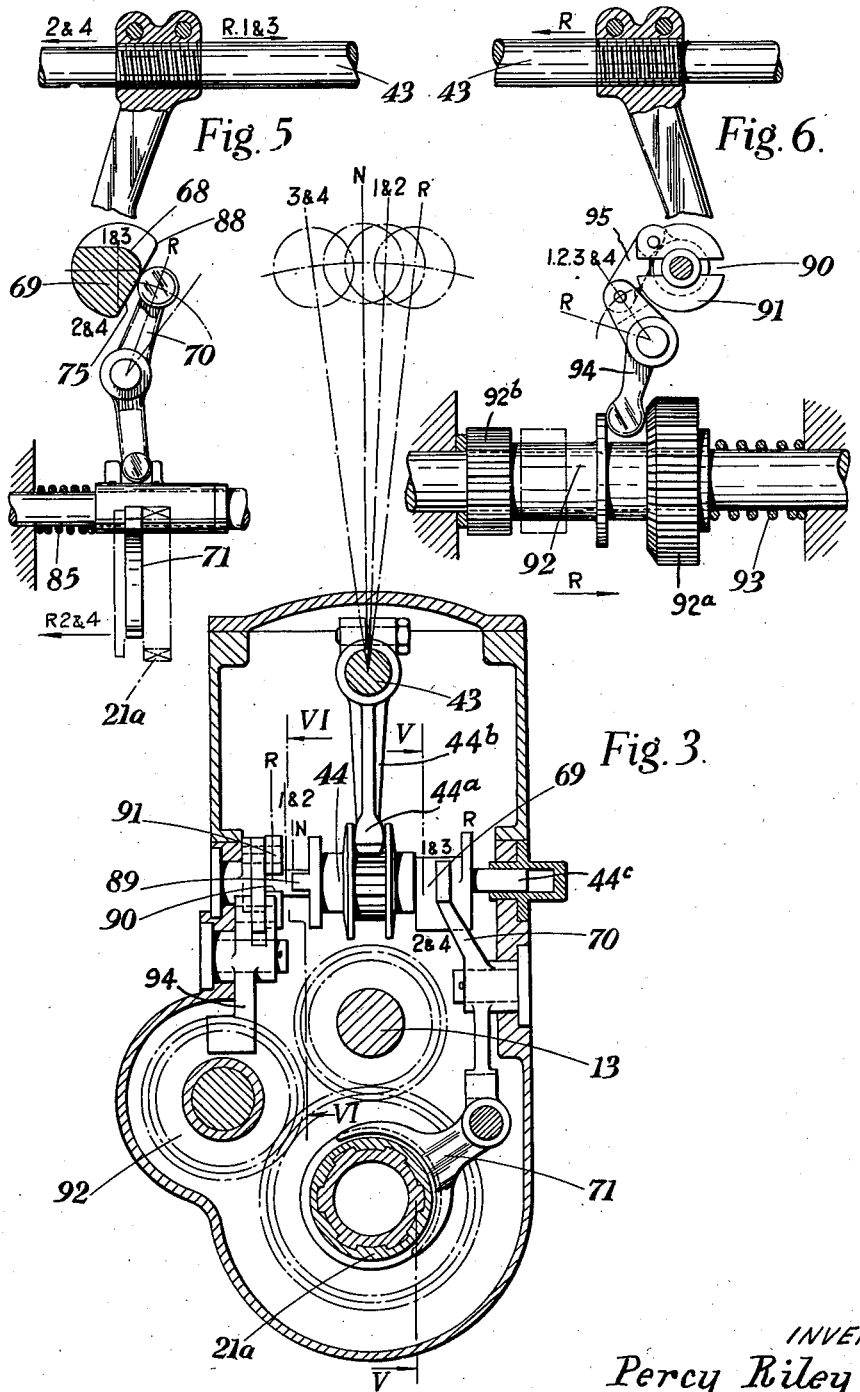

Patented July 7, 1936

2,046,428

UNITED STATES PATENT OFFICE 2,046,428

TRANSMISSION AND CHANGE SPEED MECHANISM

Percy Riley, Coventry, England

Application July 10, 1935, Serial No. 30,672
In Great Britain June 29, 1934

3 Claims. (Cl. 74—330)

This invention relates to change-speed mechanism, particularly for motor-vehicles, of the kind having co-axial shafts, a parallel layshaft, three constantly-meshed gear-pairs of which some of the gears are free, and two clutching systems through the operation of which four forward "speeds" can be obtained.

The main object of the present invention is to provide a robust gear-box of this kind in which the gear-pairs are very adequately supported, thus to ensure silence when running, and with which gear changing will be a very easy matter and can in all conditions be effected silently.

Now, according to one feature of the present invention, the three gear-pairs are arranged adjacent one another and between the two clutching systems. In this case each of the clutching systems can be arranged beyond one end of the layshaft so that it need not be restricted as to size. Consequently silent engagement for all "speeds" can be obtained without the use of any main clutch externally of the gear-box.

The invention further consists, for a motor-vehicle, of a change-speed mechanism, of the kind referred to, where the clutching system at the driving end is adapted as the main friction clutch of the vehicle.

According to a further feature of the invention, either or both of the clutching systems is hydraulically controlled.

In the accompanying drawings:—

Figure 2 is a part-sectional elevation of a combined clutch and change-speed mechanism for a motor-vehicle, and of the control thereof, adapted according to the invention, both clutching systems and the control mechanism being shown in the neutral position;

Figure 3 is an end elevation thereof taken substantially upon the line III—III of Figure 2;

Figures 5 and 6 are end elevations taken mainly on the lines V—V and VI—VI, respectively, of Figure 3 or Figure 4;

Like numerals indicate like parts throughout the drawings.

Figure 1:
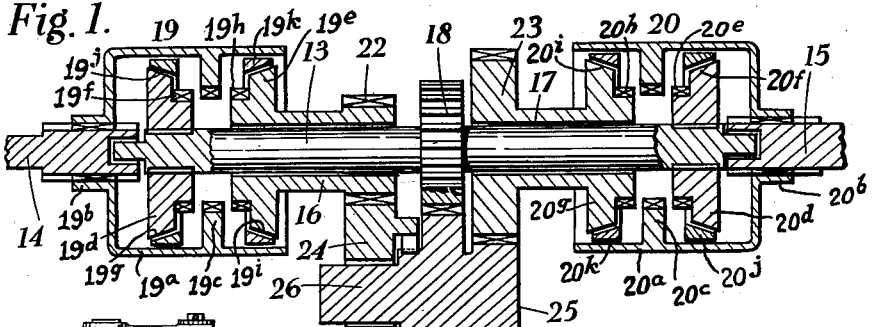
Figure 1 is a diagrammatic representation of one form of change-speed mechanism according to the invention, the two double-acting clutching systems being both shown in the neutral position.

In the construction of Figure 1, an intermediate shaft 13 is spigotally mounted in the ends of the co-axial driving and driven shafts, 14, 15, respectively. Between its ends it carries two free sleeves 16, 17 on opposite sides of a gear 18 that is fast on it. These sleeves can be directly clutched, respectively, to the driving and driven shafts by means of separate and independent double-acting friction clutch systems 19, 20, respectively. Each of these friction clutch systems, which is very diagrammatically illustrated, is shown as comprising combined synchronizing and dog clutches. The clutch 19 comprises a casing 19a having a hub 19b splined on the drive shaft 14 and a toothed clutch element 19c is carried by the inside of the casing 19a and is disposed between a clutch element 19d and 19e secured to the intermediate shaft 13 and the sleeve 16, respectively. The clutch element 19d has a toothed clutch portion 19f and a truncated friction clutch portion 19g, and the clutch element 19e has a similar toothed clutch portion 19h and a truncated friction clutch portion 19i. Frictional clutch members 19j and 19k are disposed inside the casing, and are connected together in the manner shown in Fig. 2 so that when the casing 19a is moved longitudinally of the shaft 14 in one direction the frictional element 19j will initially contact with the truncated face of the clutch member 19d and stop rotation of this member 19d so that the toothed clutch member 19c may engage the toothed clutch member 19f without clashing of the teeth.

The clutch 20 is similar in every respect to the clutch 19, and comprises a casing 20a which has a hub 20b splined onto the driven shaft 15 and a toothed clutch member 20c on the inside thereof. A clutch member 20d is secured to the intermediate shaft 13 at one side of the clutch member 20c and comprises a toothed clutch portion 20e and a truncated friction clutch portion 20f. The clutch member 20g is fixed to the sleeve 17 at the opposite side of the clutch member 20c and comprises a toothed clutch portion 20h and a truncated clutch portion 20i. Frictional clutch members 20j and 20k are disposed within the casing 20a and are adapted to selectively engage the frictional clutch portions 20f and 20i, respectively. These clutch members 20j and 20k, as shown in Fig. 2 are secured together, being secured to a rod 20l, and spring-pressed balls 20m and 20n operate to move the clutch members 20j and 20k with the casing 20a. The driven shaft 15 is provided with spaced apart recesses 20o and the ball 20m is adapted to engage in one of these recesses upon movement of the casing 20a and to thereby hold the casing 20a in the selected clutching position. The clutch 20 operates in the same manner as the clutch 19, in that, as viewed in Fig. 1, movement of the casing 20a to the left will initially effect engagement of the frictional clutching elements 20i and 20k so as to stop rotation of the sleeve 17 and permit smooth engagement of the toothed clutch members 20c and 20h. In this manner the driven shaft 15 will be coupled to the sleeve 17.

The two double-acting friction clutch systems, directly clutch the driving shaft to the intermediate shaft and the intermediate shaft to the driven shaft, respectively. In these latter conditions top or fourth "speed" is obtained, this providing a direct drive. (Owing to the connections hereinafter described, in direct drive the sleeve 17 runs idly and the sleeve 16 would also run idly if it were not disconnected by the one-way driving clutch 21 hereinafter referred to.)

The sleeves 16 and 17 have fast on them gears 22, 23, respectively alongside the gear 18, and the gears 22, 23 are in permanent mesh with gears 24, 25 on the layshaft 26, this also having a third gear 27 in permanent mesh with the gear 18 on the intermediate shaft. The gear 24 is not fast on the layshaft 26 but is coupled therewith through the clutch 21. This clutch drives when the sleeve 16 is to drive through the layshaft and overruns when the drive would be otherwise.

Second "speed" is obtained by driving direct to the intermediate shaft 13 (as in the case of fourth "speed"), from there to the layshaft 26 by the gears 18, 27, and thence to the driven shaft by way of the gears 25, 23 and the sleeve 17. (During this the clutch 21 is not driving, as previously stated as the gear 27 and the layshaft 26 are rotating faster than the gear 24 so that the clutch 21 will overrun.)

For third and first "speeds" the double-acting clutch system 19 is moved to the position in which the sleeve 16 is directly connected to the driving shaft. For third "speed" the drive is taken from the sleeve 16 to the layshaft by the gear pair 22, 24 and thence through the gears 27, 18 to the intermediate shaft which is directly connected by the other double-acting clutch system 20 to the driven shaft. In these conditions the sleeve 17 runs idly. When the clutch system 20 is moved to its other extreme position first "speed" is obtained, the drive then being taken directly from the sleeve 17 to the driven shaft whilst the intermediate shaft runs idly.

The overrunning clutch 21 may be adapted to be manually controlled, taking, for example, the form of a dog clutch which can be automatically released when overrunning is desirable, as hereinafter described.

Obviously, by changing the ratios of the gearpairs, the train previously referred to as giving second "speed" may in point of fact give third "speed", and vice versa. In this event, of course, when second "speed" is in train the sleeve 17 will turn idly; and when third "speed" is in train the overrunning occurs.

In the change-speed mechanism of Figures 2 to 8 the overrunning clutch 21 of Figure 1 is replaced by the slidable clutch sleeve 21a which is moved in a manner dependent upon the "speed" selected. When in the right-hand position (Figure 2), as illustrated, the gear 24 is clutched to the gears 27, 25 which are fast on the layshaft, and when in the left-hand position the gear 24 is disconnected therefrom.

Throughout these figures the reference characters R, 1, 2, 3 and 4, inserted at different places, refer to the reverse drive and the four different "speeds", respectively. By means of these characters and the accompanying arrows and lines the operation of the device can be more easily followed.

The change-speed mechanism itself essentially works in the manner of that of Figure 1. The clutching system 19, however, is replaced by the clutching system illustrated, and this system takes the place of the main clutch of the vehicle and is under the control of the clutch pedal 28. Both the clutching systems are in this case hydraulically operated.

Special features of the system 19 herein illustrated are described in the specification of my co-pending British patent application No. 33,216/34.

In Figures 2 to 8, inclusive, there is disclosed a means whereby the clutches associated with the gear train may be hydraulically actuated, the hydraulic means coming into operation after the particular type of gear has been manually selected. In this construction a speed or gear selecting rod 43 is supported in any suitable manner for longitudinal sliding movement and also for a limited rotatable movement, and preferably the periphery of the rod 43 is provided with a plurality of spaced apart notches 43b in which a ball 43a, which is spring-pressed, is adapted to engage. The rod 43 has an arm 44b secured thereto carrying a toothed rack 44a engageable with a pinion 44 which is rotatable and slidable on a shaft 44c (Fig. 3).

A crank arm 45 has one portion thereof engaged with the grooved pinion 44, and another arm engaged with a slide valve 46. A clutch operating piston 51 is slidable in a cylinder 50 provided with ports 49 and 84 adjacent opposite ends thereof. The housing or cylinder 50 has an inlet port 47 which is adapted to be connected to a suitable source of pressure supply. The fluid from the inlet port 47 is adapted to pass through the valve 46, through a port 48 and thence through port 49 into the cylinder 50 at one side of the piston 51. On the other stroke of the valve 46 the fluid will pass through the port 83, and port 84 into the cylinder 50 on the opposite side of the piston 51. The fluid is exhausted through the valve 46 on one stroke of the piston 51 when the exhaust port 81 registers with the port 48. The fluid will exhaust from the valve 46 through the port 82. On the other stroke of the piston 51 the fluid will exhaust through the ports 83, 86 and 87.

Movement of the piston 51 is adapted to rock the lever 52 which is operatively connected to the friction clutch 20. When the piston 51 moves under the action of the fluid entering the ports 49 the lever 52 is rocked to effect clutching of the sleeve 17, and movement of the piston 51 in the opposite direction is adapted to effect clutching of the shaft 13. It will of course be understood that the clutch 20 is splined on the driven shaft 15.

A horizontally swingable lever 41 is disposed forwardly of the selecting rod 43 and is provided with a pair of spaced apart pins 54 at its rear end between which pins a lever rocking member 53 engages. This member 53 is carried by the forward end of the rod 43. The other or forward end of the lever 41 is provided with a plurality of spaced apart teeth 55, 40, and 74, and a plurality of notches or grooves 39 between these teeth. A pair of L-shaped crank arms 33a and 33b are rockably mounted on a shaft 30, and one leg 39 of each of the crank arms 33a and 33b is disposed in dependent relation and confronts the forward end of the lever 41.

Figure 4:
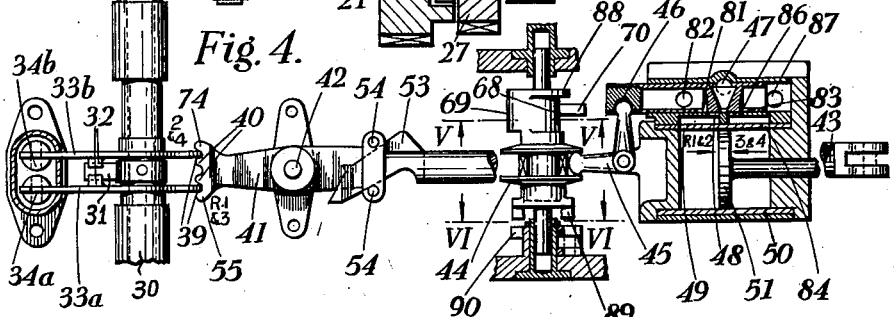
Figure 4 is a plan, mainly of the control means, the actuating piston and valve for one of the clutching systems being shown in section.
Figure 7:
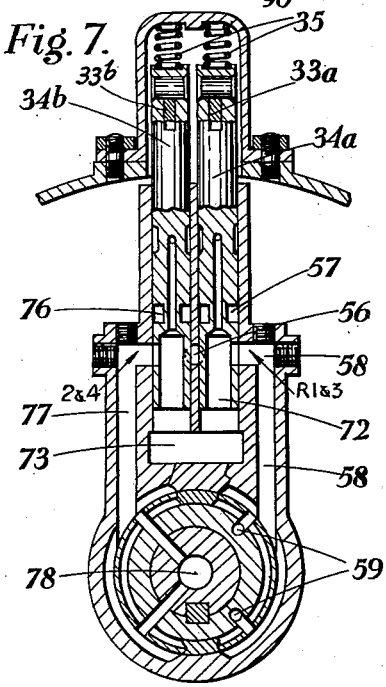
Figure 7 is a section taken mainly on the line VII—VII of Figure 2.
Figure 8:
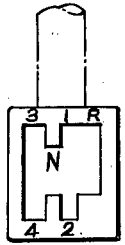
Figure 8 is a plan of the gate for the gear lever.

A clutch pedal 28 is provided which is adapted to be depressed by a foot, and a link 29 connects the clutch pedal 28 with a lever 31 which is rockable on the shaft 30 and disposed between the crank arms 33a and 33b for engagement with confronting lugs 32 carried by the horizontal or upper leg of each of these crank arms 33a and 33b, as shown in Fig. 4.

A pair of plungers 34a and 34b are slidable in suitable cylinders or housings, and the upper ends of these plungers are connected to the forward ends of the crank arms 33a and 33b, respectively. Springs 35 engage the upper ends of the plungers 34a and 34b. The plunger or valve 34a has a peripheral groove 57, which upon downward movement of the valve 34a is adapted to register with an intake port 56 and an outlet port or passage 58, which in turn communicates with a fluid passage 59 discharging in the space 36 at one side of a piston 38 which is secured as by a shaft 60 to a drive plate 61. The valve 34b has a peripheral groove 76 which, upon downward movement of the valve 34b, is adapted to likewise register with the inlet port 56 and a passage 77. The passage 77 communicates with an axial passage 78 in the drive shaft 14 and this passage 78 discharges on the opposite side of the clutch operating piston 38 in the space 37.

The drive plate 61 has a plurality of rods 62 secured thereto, and a clutching means 79 is splined on the shaft 13 between plates 64 and 80. A second clutching means 67 is disposed between plates 64 and 66, and this second clutching means 67 is splined on the sleeve 16.

The gear 24 is coupled with the gear 27 by means of a laterally slidable clutch 21a disposed between the gears 24 and 27. This clutch 21a is operated by means of a rock arm 70 having one end thereof engageable with a cam 68, 69, 75 (Fig. 5) and the other end engageable with a fork 71 which loosely engages the clutch 21a.

A reversing gear structure 92 is provided which is put in operation by lateral sliding movement of the pinion 44 under the action of partial rotation of the rod 43 so as to couple the two portions 89 and 90 of a dental clutch (Fig. 3) associated with a suitable rock lever means for shifting the gear 92.

On depression of the clutch pedal 28 the rod 29 is pulled downwardly and the shaft 30 rotated clockwise (Figure 2). This raises the crank 31 into contact with the lugs 32 on the rocking levers 33a, 33b supported upon the shaft 30 and causes the rotation of these rocking levers slightly clockwise. This raises the plunger valves 34a, 34b against the pressure of the return springs 35 slightly above the open positions which are actually illustrated. In these conditions the spaces 36, 37 on opposite sides of the piston 38 are connected with the exhaust, allowing the piston to take up an intermediate position and thus to free the double-acting clutching system 19, as hereinafter described. At the same time the tail ends 39 of the rocking levers 33a, 33b are moved clear of the teeth 40 in the rocking lever 41 which is journalled at 42 for movement about a vertical axis.

The arrangement and disposition of the parts will best be understood, it is believed, from a description of the operation of the mechanism. If I assume that the change-speed lever is in the neutral position marked N in Figures 2, 3 and 8, as is actually illustrated, and that first "speed" is to be engaged, the lever must first be moved to the right (Figures 3 and 8), rotating the operating rod 43 clockwise slightly (Figure 3). This rod is rotatable and axially slidable, the spring-pressed ball 43a co-acting with the grooves 43b therein in a well understood manner, but is located against lateral movement. Rotation of the shaft as mentioned slides the grooved pinion 44 to the left in Figure 3 and downwardly in Figure 4, thus rotating the bellcrank lever 45 counter-clockwise (Figure 4) and sliding the slide valve 46 to the left. Oil under pressure entering by the port 47 passes through the port 48 and the port 49 into the left-hand end of the cylinder 50, thus driving the plunger 51 to the right (Figures 2 and 4). This rocks the lever 52 clockwise (Figure 2) and slides the movable element of the clutching system 20 to the left to effect a direct connection between the sleeve 17 and the driven shaft 15, as is necessary for first "speed."

When the gear lever is moved forwardly into the first "speed" position—to the left in Figure 2—the operating rod 43 is drawn to the right. The other end of the operating rod has a bent part 53 loosely engaged between pins 54 on the rocking lever 41, and it will be evident that movement of the operating rod to the right will rotate the rocking lever 41 clockwise (Figure 4), moving the tooth 55 to a position above (Figure 4) the associated rocking lever 33a. Movement of this kind can only be effected, however, when the rocking levers 33a, 33b have been moved clear of the teeth of the rocking lever 41, as is effected by depression of the main clutch pedal 28.

On the release of the main clutch pedal the springs 35 return the plunger valves 34a, 34b as far as possible. The plunger valve 34b engaged with the rocking lever 33b cannot return beyond the position illustrated, owing to the rocking lever 33b engaging with the middle tooth of the rocking lever 41. As the lower rocking lever 33a is clear of the tooth 55, however, the associated valve plunger 34a responds fully to the pressure of the spring 35. In the operative position thereof oil supplied to the inlet 56 enters the groove 57 (Figure 7) and passes from there by the bore 58 to the bores 59, thus supplying the space 36 with oil under pressure and forcing the piston 38 to the right (Figure 2). Fast on the stem 60 of the piston is the driving plate 61 carrying the driving pins 62. Movement of these to the right compresses the springs 63 against the presser plate 64. By this means the driven plates 67, which are slidingly splined on the sleeve 16, are clamped between the presser plate 64 and the driving plate 66 and the drive is thus transmitted from the driving shaft 14 to the sleeve 16.

The sliding movement of the operating rod 43 to the right also effects rotation of the grooved pinion 44 clockwise (Figures 2 and 5). From Figure 5 it will be seen that such rotation causes the concentric portion 68 of the cam 69 to revolve against the rocking lever 70, which thus remains stationary. The rocking lever 70 is engaged with the striking fork 71 through which the slidable clutch member 21a is movable. Thus, when engaging first "speed" this slidable clutch member is not moved but remains in the position illustrated in Figure 2.

If second "speed" is now to be engaged, the first operation that is essential is the depression of the main clutch pedal 28 in order to release the rocking lever 33b from the middle notch of the rocking lever 41. Depression of the clutch pedal effects the raising of the plunger valve 34a as described and the space 36 then exhausts along the bores 59, the passage 58 and the bore 72 to the space 73 communicating with the interior of the crankcase or elsewhere. This returns the clutch system 19 to the neutral position and, of course, disconnects the drive—i. e., before the gear lever is moved.

On moving the gear lever from the first to the second "speed" position the operating rod 43 is moved fully to the left (Figures 2 and 4) and in so moving the rocking lever 41 is rocked counter-clockwise (Figure 4) to carry the tooth 74 below the associated rocking lever 33b and to align the middle notch with the rocking lever 33a. As no rotary movement is given to the operating rod 43 the grooved pinion 44 is not slid but it is rotated counter-clockwise (Figure 2) by the sliding motion of the operating rod. Counter-clockwise movement, it will be seen from Figure 5, causes the eccentric portion 75 of the cam 69 to engage the rocking lever 70 and move it clockwise, thus sliding the striking fork 71 to the left to free the clutch 21a. The slide valve 46, however, is not moved and the clutching system 20 thus remains in the position occupied by it for first "speed", i. e., interconnecting the sleeve 17 with the driven shaft 15.

On release of the clutch pedal the rocking lever 33b is able to move freely clear of the rocking lever 41 under the pressure of the appropriate spring 35, whilst the plunger valve 34b is depressed. Oil entering by the port 56 then flows by way of the groove 76 (Figure 7) along the passage 77 to the bore 78, whence it is delivered to the space 37, thus driving the piston 38 to the left (Figure 2). Movement of the pins 62 to the left biases the springs 65 against the presser plate 64 whilst relieving the latter of the pressure of the springs 63, and thus the driven clutch discs 79, which are slidably splined upon the intermediate shaft 13, are clamped between the presser plate 64 and the driving plate 80. This effects the direct connection of the intermediate shaft and driving shafts.

When moving from second to third "speed" the clutch pedal 28 must again be depressed before the change-speed lever can be moved into a neutral position out of the second "speed" position. When moving through the gate the operating rod 43 is rotated counter-clockwise (Figure 3), thus sliding the grooved pinion 44 upwardly (Figure 4). This rotates the bellcrank 45 clockwise and slides the slide valve 46 to the right. The pressure at the left hand end of the cylinder 50 then exhausts by way of the ports 49, the ports 48 and the port 81 to the exhaust pipe 82 leading to the crank chamber or elsewhere, and at the same time the incoming oil entering through the port 47 passes through the port 83 and the ports 84 to the right-hand end (Figure 2) of the cylinder 50, thus forcing the piston 51 to the left. This throws over the clutching system 20 which effects the direct connection of the intermediate shaft 13 to the driven shaft 15.

The fore-and-aft motion of the gear lever from the second to the third "speed" positions, sliding the operating rod 43 to the right effects those movements previously described when moving the gear lever from the neutral to the first "speed" position. That is to say, the rocking lever 70 (Figure 5) again abuts the concentric portion 68 of the cam 69, allowing the striking fork 71 to be returned to effect engagement of the clutch 21a under the pressure of the spring 85. The oil from the space 37 is exhausted by the bore 78, the passage 77 to the space 73.

When changing from third to fourth "speed" the operating rod 43 will not be rotated and the slide valve 46 will not, therefore, be moved. The operating rod, however, will be shifted to the left (Figure 2), thus effecting the clamping of the driven plates 79 between the driving plate 80 and the presser plate 64, as previously described, whilst oil in the space 36 exhausts along the bores 59 and the passage 58. At the same time the pinion 44 is again rotated anti-clockwise (Figures 2 and 5), thus effecting the release of the clutch 21a.

When reverse speed is to be engaged the grooved pinion 44 is slid downwardly (Figure 4) to bring oil under pressure to the left-hand end of the cylinder 51, as previously described. 86 and 87 represent exhaust ports by which the oil at the right-hand end of the cylinder 51 can escape when the slide valve 46 is to the left. Furthermore the full downward movement (Figure 4) of the pinion 44 (with the parts carried thereby) brings the raised portion 88 of the cam 69 into alignment with the rocking lever 70. Consequently, when the operating rod 43 is slid to the right (Figures 2 and 5) and the cam 69 is rotated clockwise, the clutch 21a will be released. The full movement of the gear lever to the right (Figures 3 and 8) also slides the dogs 89 into mesh with corresponding recesses 90 on the disc 91 (Figure 6) and on the sliding of the rod 43 and the consequent rotation of the disc 91, the double reverse gear 92 is slid against the pressure of the return spring 93, i. e., to the left in Figure 2, thus interconnecting the gear 24 with the gear 23. When the clutch pedal 28 is released the drive is taken from the driving shaft 14 directly to the sleeve 16, thence by the gear pair 22, 24 to the double reverse gear 92, and thence to the gear 23 on the sleeve 17 which is directly connected to the driven shaft 15. The intermediate shaft is in these conditions driven idly from the gear 23 by the gear 25 and the gear pair 27, 18.

The cam member 68, 69, 75 is fixed to the shaft 44c at one side of the pinion 44 and the clutch element 89 is fixed to this shaft 44c on the opposite side of the pinion 44. In Fig. 3, movement of the pinion 44 to the right by partial rotation of the selector 43 will effect engagement of the lever 70 with the cam, and the particular cam portion is selected by longitudinal movement of the selector 43 which will in turn rotate the pinion 44 and thereby bring the desired cam portion into action with respect to the lever 70. The different cam portions are clearly illustrated in Fig. 5.

Rotation of the selector 43 in the opposite direction, or to the left in Fig. 3 will effect engagement of the clutch element 89 with the clutch element 90—91, and longitudinal movement of the selector 43 will then rock the lever 94 which is connected by a link 95 to the clutch element 90—91. Rocking of the lever 94 will slide the gears 92a and 92b into engagement with the gears 24 and 25, respectively.

By means of the invention the three constantly-meshed gear-pairs are arranged close to one another so that the layshaft is very short. This allows of supporting these gears in an adequate manner so that silence in running can be obtained. Silent engagement can be ensured when any of the four forward "speeds" is being introduced. Owing to the absence of any independent main clutch manufacture and assembly can be inexpensively carried out. Moreover, the overall size of the transmission and change-speed mechanism, owing to the grouping of the gear-pairs beside one another, compares favourably with that of equivalent mechanisms in present-day motor-vehicles.

What I claim as my invention and desire to secure by Letters Patent of the United States is:—

1. A change speed mechanism comprising a drive shaft, a driven shaft, an intermediate shaft coaxial with said drive shaft and said driven shaft, a gear fixed on the intermediate shaft between the ends thereof, a pair of sleeves loose on the intermediate shaft one on each side of said intermediate gear, a gear on the end of each sleeve adjacent said intermediate gear, a clutch element on the opposite end of each sleeve, a clutch element secured to the opposite ends of the intermediate shaft, a movable clutch element secured to the drive shaft, a movable clutch element secured to the driven shaft, a lay shaft parallel with the intermediate shaft, a gear fixed to the lay shaft and meshing with the intermediate gear, a second gear fixed to said lay shaft meshing with the gear of one of said sleeves, a loose gear on the lay shaft meshing with the gear of the other sleeve, clutch means for coupling said loose gear with said lay shaft, a selector means for moving the driven shaft clutch element into engagement with the adjacent clutch element of one of the sleeves or the intermediate shaft, means for moving the drive shaft clutch element into engagement with the adjacent clutch element of the other sleeve or the intermediate shaft, and means carried by said selector means whereby to determine the clutching engagement of the drive shaft clutching element.

2. A change speed mechanism comprising a drive shaft, a driven shaft, an intermediate shaft coaxial with said drive shaft and said driven shaft, a gear fixed on the intermediate shaft between the ends thereof, a pair of sleeves loose on the intermediate shaft one on each side of said intermediate gear, a gear on the end of each sleeve adjacent said intermediate gear, a clutch element on the opposite end of each sleeve, a clutch element secured to the opposite ends of the intermediate shaft, a movable clutch element secured to the drive shaft, a movable clutch element secured to the driven shaft, each of said movable clutch elements including a toothed clutching means and a frictional clutching means, said first and second clutch element also including a toothed clutching means and a frictional clutching means, a lay shaft parallel with the intermediate shaft, a gear fixed to the lay shaft and meshing with the intermediate gear, a second gear fixed to said lay shaft meshing with the gear of one of said sleeves, a loose gear on the lay shaft meshing with the gear on the other sleeve, clutch means for coupling said loose gear with said lay shaft, a selector means for moving the driven shaft clutch element into engagement with the adjacent clutch element of one of the sleeves or the intermediate shaft, means for moving the drive shaft clutch element into engagement with the adjacent clutch element of the other sleeve or the intermediate shaft, and means carried by said selector means whereby to determine the clutching engagement of the drive shaft clutching element.

3. A change speed mechanism comprising a drive shaft, a driven shaft, an intermediate shaft coaxial with said drive shaft and said driven shaft, a gear fixed on the intermediate shaft between the ends thereof, a pair of sleeves loose on the intermediate shaft one on each side of said intermediate gear, a gear on the end of each sleeve adjacent said intermediate gear, a clutch element on the opposite end of each sleeve, a clutch element secured to the opposite ends of the intermediate shaft, a movable clutch element secured to the drive shaft, a movable clutch element secured to the driven shaft, a lay shaft parallel with the intermediate shaft, a gear fixed to the lay shaft and meshing with the intermediate gear, a second gear fixed to said lay shaft meshing with the gear of one of said sleeves, a loose gear on the lay shaft meshing with the gear of the other sleeve, clutch means for coupling said loose gear with said lay shaft, a selector means, fluid operated clutch operating means connected to said selector means for moving the driven shaft clutch element into engagement with the adjacent clutch element of one of the sleeves or the intermediate shaft, and fluid operated clutch operating means connected to the drive shaft clutch element for moving the drive shaft clutch element into engagement with the adjacent clutch element of the other sleeve or the intermediate shaft.

PERCY RILEY.